United States Patent

[11] 3,599,231

[72] Inventor Gunther Rapp
Munich, Germany

[21] Appl. No. 782,515
[22] Filed Dec. 4, 1968
[45] Patented Aug. 10, 1971
[73] Assignee Siemens Aktiengesellschaft
Berlin and Munich, Germany
[32] Priority Dec. 12, 1967
[33] Germany
[31] P 15 49 065.0

[54] CONSTANT VALUE STORER
1 Claim, 4 Drawing Figs.

[52] U.S. Cl. 340/174 SP, 340/174 DC, 340/174 TF, 340/174 QB
[51] Int. Cl. G11c 17/00, G11c 11/04, G11c 7/02
[50] Field of Search 340/174

[56] References Cited

UNITED STATES PATENTS

| | | | |
|---|---|---|---|
| 3,380,039 | 4/1968 | Pick | 340/174 |
| 3,435,434 | 3/1969 | Meier | 340/174 |
| 3,417,382 | 12/1968 | Snyder et al. | 340/174 |
| 3,474,424 | 10/1969 | Tsui | 340/174 |

*Primary Examiner*—Stanley M. Urynowicz, Jr.
*Attorney*—Hill, Sherman, Meroni, Gross & Simpson ABSTRACT: Structures forming transformer read-only storers so as to substantially eliminate capacitive coupling between adjacent layers of stacked storers so as to substantially eliminate incorrect output signals from the storer. Alternate storage planes are formed with input leads transposed so as to substantially eliminate capacitive coupling.

INVENTOR
GÜNTHER RAPP

BY Hill, Sherman, Meroni, Gross & Simpson ATTORNEYS

C-C

INVENTOR
GÜNTHER RAPP

BY Hill, Sherman, Meroni, Gross & Simpson
ATTORNEYS

CONSTANT VALUE STORER

BACKGROUND OF THE INVENTION

1. Field of the Invention

This invention relates in general to transformer read-only storers and in particular, to improved methods and structures for such storers.

2. Description of the Prior Art

Transformer read-only storers have been described in the article by D. M. Taub and B. W. Kington appearing in the IBM-Journal of Sept. 1964, pages 443 through 459.

Read-only storers have been used in telephone systems and digital computers to store fixed information such as code translations, subroutines, control programs and other types of informations.

In read-only storers the operation depends on the presence or absence of mutual inductance between two circuits to determine whether a binary one or zero has been stored. A conductor, called a word line passes through a plurality of magnetic units and a word is stored for each word line. There is one transformer core for each digit in the output word. A word line either threads through or bypasses an individual magnetic unit depending upon whether the corresponding digit in that work is one or zero. To read out a word a current pulse passes through the corresponding word line and this causes an output current representing "one" to appear from the transformers through which the word line is threaded. It is desirable that those transformers through which the word line is not threaded produce no output. However, due to the impedance of the word lines and the capacitance between them in practice an output is obtained from those transformers where zero output is desired.

Transformer read-only storers have been constructed of flexible printed circuit tapes that are used with transformer cores consisting of U-shaped members and I-shaped piece and each tape accommodates two word lines with one associated with each limb of the U-shaped core. The tapes might be made by bonding copper to a flexible substrate such as Mylar film and by etching so as to leave two ladder-shaped conductors. At each core position along the tape, holes are punched in one string of the ladder-shaped conductors or the other, depending on whether a zero or one is to be written in that position. A plurality of flexible substrates may be stacked one above the other but in prior art devices capacity coupling between currents passing through word lines in one of the substrates tends to cause currents in the adjacent and other substrates.

Thus, when any readout conductor is energized during the reading operation interference currents flow due to the capacitive coupling in the remaining substrates and it becomes more difficult to distinguish between one and zero signals due to the interference.

SUMMARY OF THE INVENTION

The present invention comprises read-only transformer storers in which planar substrates of two different kinds are alternately stacked and the word lines in adjacent substrates are transposed to eliminate capacity coupling between the adjacent substrates.

Other objects, features and advantages of the present invention will be readily apparent from the following detailed description of certain preferred embodiments thereof taken in conjunction with the accompanying drawings.

DESCRIPTION OF THE PREFERRED EMBODIMENT

Figure 1:
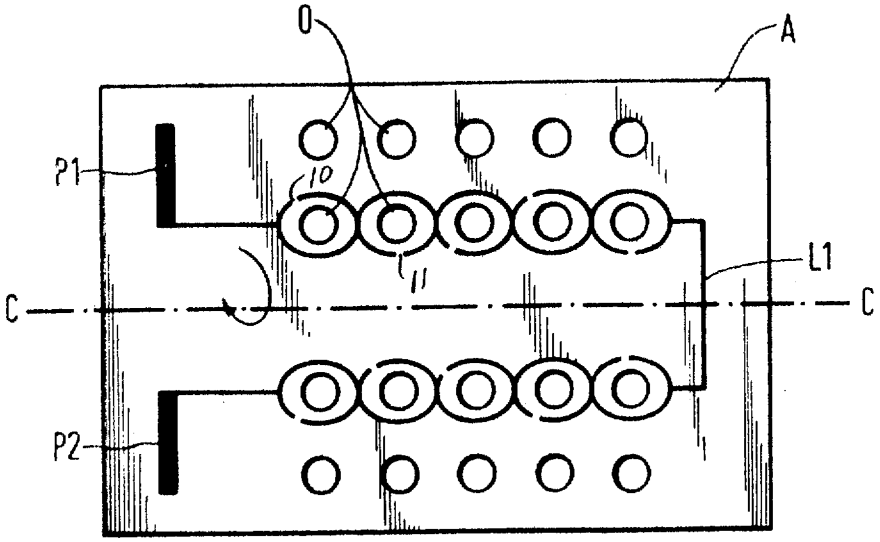
FIG. 1 illustrates the form of a first substrate read-only storer.
Figure 3:
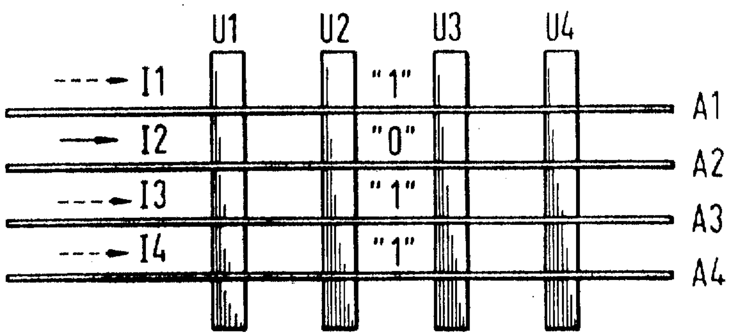
FIG. 3 is a sectional view taken on lines C–C of FIG. 1 and illustrates the interferring currents with a plurality of stacked substrates according to FIG. 1.

FIG. 1 illustrates a planar printed circuit portion A of a read-only storer comprising input terminals P1 and P2 and the word line L1 extending between them. The legs of a transformer not shown extend through the openings "O" formed through the planar substrate A. Since such transformers are well known to those skilled in the art are not illustrated in FIG. 1. However, the legs of such transformers are illustrated in FIG. 3 which illustrates a plurality of substrates A1 through A4 formed according to FIG. 1. Tape is mounted about certain of the openings O in substrate A and the tape conductors have gaps 10 or 11 formed on one or other side of the tape. The side of the opening upon which the gap 10 or 11 is formed determines whether the particular leg of a transformer passing through an opening "O" will read out "zero" or "one."

FIG. 3 illustrates a sectional view through a plurality of substrates A constructed according to FIG. 1. For example the the substrates A1 through A4 are mounted above each other and the legs of transformers U1 through U4 extend through the openings "0" formed in the substrates.

In the substrate stacks as shown in FIG. 3 coupling capacitances exist between the adjacent substrates. Forexample,withalloffthesubstrates A1 through A4 of the same configuration as shown in FIG. 1 the input coupling capacitance between the connection points P1 and P2 of each substrate is large. The interference currents are illustrated in FIG. 3. For example, if it is assumed that a current I2 is applied to the substrate A2 to read the stored information, an interference current will flow because of the input coupling capacitance in substrates A1, A3 and A4 as shown in the drawings by the dotted arrows and designated as I1, I3 and I4 and will have the direction as shown by the arrows. If the transformer leg U2 has a "one" stored in the substrates A1, A3 and A4 and a "zero" in the substrate A2, then no magnetic flux will be generated in the transformer leg U2 by the current 12. However, the interference currents I1, I3 and I4 generate in the transformer leg U2 a magnetic flux in the same direction as a flux which would flow if a logical "one" was stored in the substrate A2. The read signal detected at U2 thus has the same polarity as a "one" signal although with a smaller amplitude. As a rule this signal will fade generally more rapidly than a "one" signal.

Figure 2:
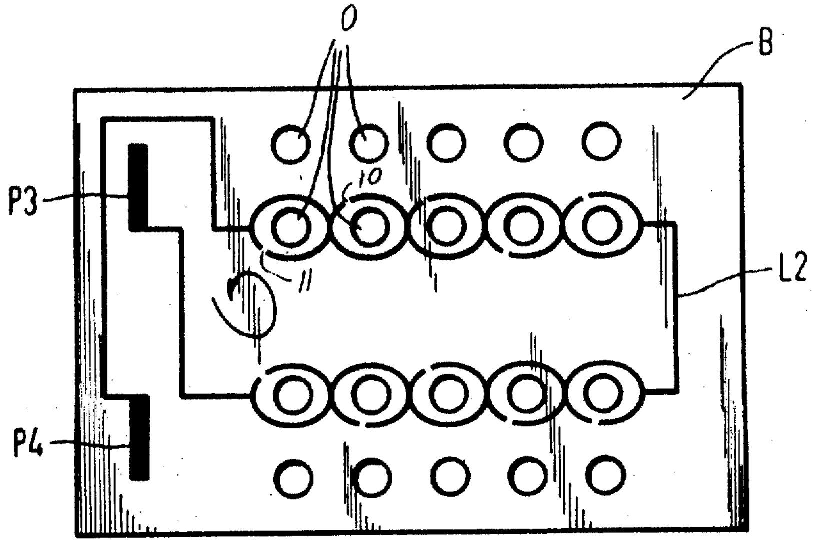
FIG. 2 illustrates the form of a second type of read-only storer.

FIG. 2 illustrates a substrate B which includes the openings "O" for the transformer legs but in which the input connection points P3 and P4 have been transposed relative to those of the substrate A. By transposing the input leads P3 and P4 the read current will travel in the opposite direction through the storer relative to the substrate read current in FIG. I.

Figure 4:
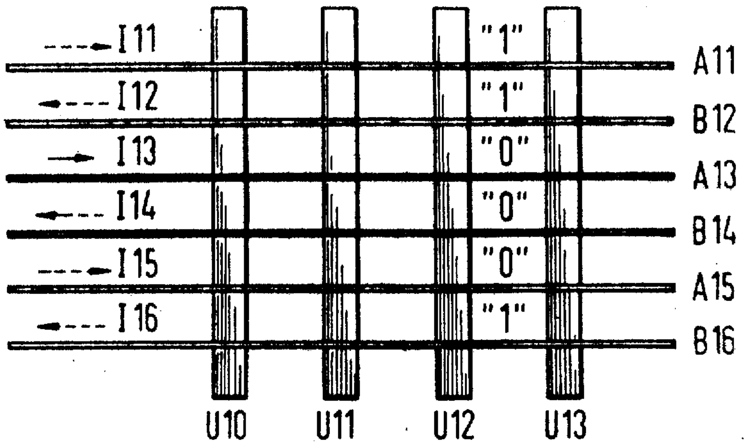
FIG. 4 illustrates the interference currents in a stack of plurality of substrates in which alternate substrates are of the type illustrated in FIG. 1 and intermediate substrates are of the type illustrated in FIG. 2.

FIG. 4 illustrates a plurality of substrates A and substrates B stacked alternately so as to substantially reduce interference currents which exist in the structure of FIG. 3.

FIG. 4 for example illustrates a sectional view through a plurality of A and B substrates A11, B12, A13, B14, A15, and B16. The transformer legs U10, U11, U12 and U13 extend through the openings "O" in the substrates.

If the word line of the substrate A13 is energized in the structure of FIG. 4 then a current I13 will flow in substrate A 13 as illustrated by the arrow in FIG. 4. The interference currents I11, I12, I14, I15 and I16 will flow through the input coupling capacitances in the directions illustrated by the broken arrows adjacent the substrates other than A13. The largest interference currents will flow in the substrates adjacent the substrate A13 which are B12 and B14.

If a logical "zero" is stored in substrate A13 the current I contributes nothing to the flux in transformer leg U12. However, interference flux in generated in transformer leg U12 by substrates A11, B12 and B16. A resulting flux in the transformer leg U12 however, will be generated by the interference currents in the storage substrates which have the logical "ones" adjacent the transformer leg U12. These are the substrates A11, B12 and B16. A flux is generated by the interference current flowing in the type B substrates in the transformer leg U12 which flows opposite to the flux which would be caused by a logical "1" stored in the substrate A13. This flux will be superimposed by the flux generated by the interference currents of the substrate of type A configuration. The direction of the resultant flux in the transformer leg U12 will be determined by the number of logical "1's" in the substrates of type A and substrates of type B at the corresponding transformer leg and will also be a function of the distance of the substrates from the substrate being read. If logical "1's" predominate in a type of substrate different from the substrate being read, a flux opposite to the flux generated in the transformers which would be generated in the case of a "1" to be read will exist. A reading signal for the logical "0" will than have a polarity opposite to the "1" signal.

If the logical "1's" predominate in the substrate type identical with the substrate to be read, a "0" signal can be produced which has a polarity like a "1" signal, , although it will be considerably attenuated. In any event due to the attenuation of the superposition, substrate types A and B will have much less interference than between substrates of the same type as in FIG. 3. Thus, by merely transposing leads P3 and P4 for the substrates B as shown in FIG. 2 and by alternately mounting substrates A and B as shown in FIG. 4, a substantial reduction in interference between the substrates will occur.

It is seen that this invention provides means for substantially reducing interference between adjacent substrates in a transformer read-only storer.

Although minor modifications might be suggested by those versed in the art, it should be understood that we wish to embody within the scope of the patent warranted hereon all such modifications as reasonably and properly come within the scope of our contribution to the art.

I claim:

1. A read-only storer in which the legs of transformers extend through a plurality of superposed substrates provided with row conductor paths having input points and where the row conductor paths form loops around said legs on the individual substrates, comprising a first plurality of said substrates, each substrate having first and second of said row conductor paths located on opposite sides of said substrate, said first plurality of substrates having first and second input terminals formed at one end thereof with the first input terminal connected to said first conductor path on one side of each substrate and the second input terminal connected to the second conductor path on the second side of each substrate, the ends of the row conductor paths on each of said first plurality of substrates located away from the first and second input terminals connected together, a second plurality of substrates, each substrate having first and second of said row conductor paths located on opposite sides of said substrate in vertical alignment respectively with the first and second row conductor paths of said first plurality of substrates, first and second input terminals formed on each of said second plurality of substrates in vertical alignment respectively with the first and second terminals formed on said first plurality of substrates, said first row conductor path connected to said second input terminal and said second row conductor path connected to said first input terminal on each of said second substrates, and the ends of the row conductor paths on each of said second plurality of substrates located away from the first and second input terminals connected together, and said read-only storer comprising alternate substrates of said first and second types formed in a stack above each other and with the legs of transformers extending through the loops of the individual substrates.